March 8, 1927.

G. A. BARNARD

GAME TRAP

Filed Nov. 4, 1926

1,620,182

Inventor

G. A. Barnard

By Emil F. Lange

Attorney

Patented Mar. 8, 1927.

1,620,182

UNITED STATES PATENT OFFICE.

GEORGE A. BARNARD, OF NEAR PRINCETON, NEBRASKA.

GAME TRAP.

Application filed November 4, 1926. Serial No. 146,098.

My invention relates to animal traps, its object being the provision of a trap which is rugged in construction and in which the chances of the animals being caught are greatly increased and the chances of escape from the trap are greatly decreased. Furthermore, it is my object to provide a trap which may be set in snow or slush and which will remain in operative condition even though ice is frozen about it.

Initially and primarily the trap in its present embodiment is designed for the trapping of coyotes which are probably the most wary and shrewd of the wild game found in this country. The extermination of coyotes is desirable because of the depredations on the domestic animals of the farmyard, including poultry, pigs and even calves. The prior traps are successful to only a very slight extent in trapping coyotes and it is my object to provide a trap which is much more certain than the prior traps for both catching and retaining the coyotes.

Having in view these objects and others which will be pointed out in the following description, I will now refer to the drawings, in which—

The body portion of the trap consists of two members 10 of strap iron which are bent into bowed form, the end portions being bent abruptly toward each other and then into parallel relation. The two members 10 are secured together at their ends by means of rivets 11 or by any other suitable fastening means. At the bottom of the body and on the transverse axis there is a strap 12 connecting the two members 10. The strap 12 functions to maintain the form of the body of the trap and it also has another function which will be pointed out in the description of the mode of operation of the trap.

Figure 1:
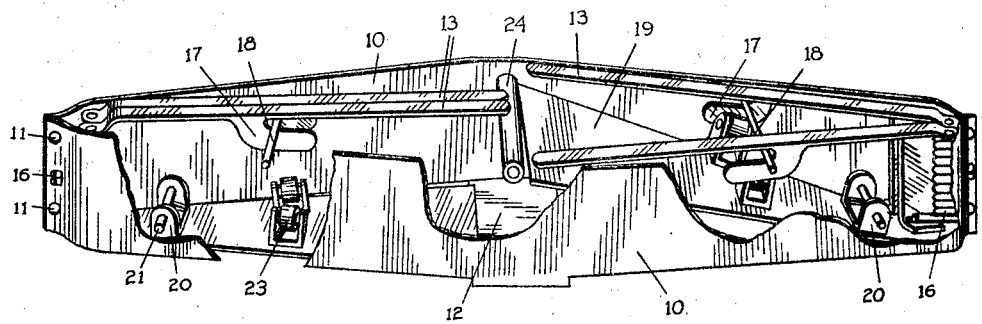
Figure 1 is a view in perspective of the entire trap, a portion of the shell of the body of the trap being broken away to disclose the interior construction, the view also showing one pair of jaws in its closed position and the other pair of jaws in its open position.
Figure 2:
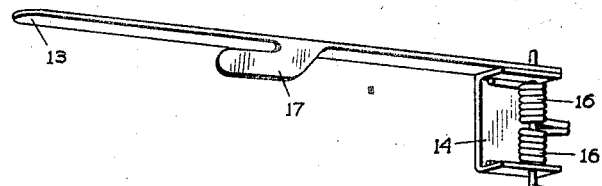
Figure 2 is an illustration showing one of the jaw members.

The body members each consist of a jaw proper 13 with certain additional features as best shown in Figure 2. At the pivot end of the jaw is a U-shaped member 14 secured thereto and having aligning apertures through both ears of the member 14 and through the jaw 13. The pin 15 passing through these aligning apertures serves as a support for springs 16. Both springs 16 have their outer ends bearing against the body portion of the member 14 as shown in Figure 2, the inner ends being contiguous and at substantially the middle point of the pins 15. The pin 15 is prevented from being displaced by upsetting or heading its ends. In securing these jaws in place in the body portion of the trap, the jaws of each pair are placed back to back as shown in Figure 1, they being slightly spaced. They are secured in position by passing the free ends of the springs 16 through suitable apertures in the ends of the straps 10. The springs tend to hold the two jaws of the pair in parallel relation. To further hold the jaws in the trap and to prevent displacement due to the struggles of the animal the jaws are provided with depending members 17 having slots for engaging the pin 18, the pin 18 passing through suitable apertures in the members 10 and being riveted thereto. The pin 18 does not interfere with the normal movements of the jaws 13 but it does prevent upward or downward movements of the jaws such as is likely when the animal attempts to withdraw his foot from the trap. The trap as shown in Figure 1 includes two pairs of oppositely disposed jaws.

Figure 3:
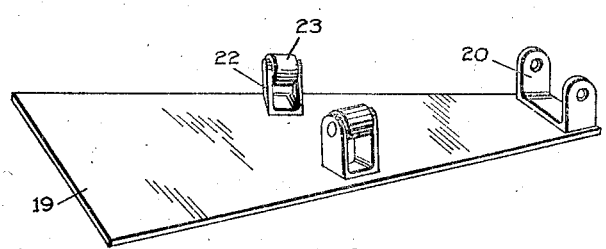
Figure 3 is an illustration of the trigger.

The trigger is shown in Figure 3. This consists of a metal plate 19 conforming in shape roughly to the shape of the space which it occupies in the bottom of the body of the trap. It is made slightly smaller than this space so as to facilitate freedom of movement of the trigger. At its smaller end it is provided with a pair of upturned ears 20 which are apertured for receiving a pin 21, the pin 21 passing through the members 10 and being riveted thereto. Intermediate its ends the trigger is provided with two U-shaped clips 22 having a roller 23 or other suitable anti-friction device between the ears of each clip. The function of these anti-friction devices is made clear by reference to the showing in the right-hand portion in Figure 1. When the jaws 13 are spread the trigger 19 is raised to bring the rollers into contact with the depending member 17 and between the two members 17 of the pair so as to keep them spread.

Figure 4:
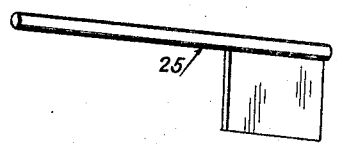
Figure 4 is a view in perspective of the key which is used in setting the trap.

The trap is set by means of the key 25 shown in Figure 4. This key is inserted between the two jaws 13 of a pair and is turned to spread the jaws, after which the trigger 19 is pushed upwardly until the rollers 23 engage the parts 17 of the jaws to keep them in spread apart relation. This is done with both sets of jaws and the trap is then set in position. When the animal steps on the trigger 19, it depresses the rollers 23 and releases the jaws of the pair whereupon the springs 16 will force the jaws together.

In setting this trap for coyotes a hole of suitable size is scooped out of the snow and the trap is placed in the hole with the jaws spread as shown at the right in Figure 1. The trap is then covered with a piece of paper of suitable size and snow is placed on the paper. If the animal steps on either trigger 19 the pair of jaws controlled by that trigger will be forcibly closed under the action of the springs 16. Since the two triggers cover almost the entire bottom surface of the trap there is practically no possibility of the animal failing to spring the trap if it gets one of its feet within the jaw portion of the trap. In order to make it even more certain that the animal will spring the trap I have provided a roller 24 which is loosely mounted on a pin, the roller 24 being immediately above the plate 12. This, of course, prevents the animal from accidentally stepping on the plate 12 and thus avoiding both triggers. The instant the animal's foot touches the roller 24 under his weight the foot will slip off to either the right or left and on to one of the two triggers 19.

The members 10 of the body portion of the trap are purposely made rather wide. In many of the prior traps the coyote because of his quick-wittedness is apt to be caught by the toes only. When this occurs the coyote will invariable gnaw off his toes and thus escape. With the members 10 having the width which I propose to give to them the coyote is apt to be caught at or near the knee which will make escape impossible. The trap is moreover closed at its bottom and it thus affords the coyote no opportunity of securing access to the interior of the trap, the upper portion being too near its body.

While I have described my invention as being particularly applicable to the trapping of coyotes it is to be understood, however, that the trap may be used for catching any kind of game for which it is adapted. In the case of coyotes and similar animals the trap is set in runs and other places which are frequented by the animals. For catching larger animals such as bears or smaller animals such as rats, the size and proportions of the trap must, of course, be varied and in some cases the particular manner of use must also be varied. For example, when the trap in the proper size is used for trapping gophers the gopher burrow must be opened and the trap must be set in inverted position over the opening. The gopher in investigating the opening and in attempting to close up the opening will be caught in the trap.

Having thus described my invention in such full, clear, and exact terms that its construction and operation will be readily understood by others skilled in the art to which it pertains, what I claim as new and desire to secure by Letters Patent of the United States is:

1. In an animal trap, a frame having sides of relatively wide strap iron, a pair of jaws within said frame and positioned immediately beneath the upper edges of said frame, said jaws being spring pressed toward each other, a trigger pivotally secured to said frame in the bottom portion thereof, and an anti-friction device on said trigger.

2. In an animal trap, a frame having sides of relatively wide strap iron, a pair of jaws within said frame and having pivotal connection therewith at one end thereof, each of said jaws being provided with a pair of springs for urging said jaws toward each other into parallel relation, said jaws being positioned immediately beneath the plane of the upper edge of said frame, a trigger pivotally secured within and to said frame in the bottom part thereof, and anti-friction devices on said trigger for engaging said jaws.

3. In an animal trap, a frame having relatively wide sides, a pair of vertical pins positioned within said frame at one extremity thereof, each of said pins having a horizontal jaw integral therewith at the upper extremity thereof, springs surrounding said pins and having their outer ends secured to said frame, said springs being adapted to urge said jaws toward each other into parallel relation, a transverse pin secured to said frame, projections on said jaws for slidably engaging said transverse pin, a trigger secured to and within said frame in the bottom portion thereof, and a pair of anti-friction devices on said trigger for engaging said projections to hold said jaws in spaced apart relation.

4. In an animal trap, a frame comprising a pair of bowed plates which are secured together at their extremities, said frame being provided with a pair of jaws at each end thereof, said jaws being spring pressed toward each other and being positioned immediately beneath the plane of the upper edges of said frame, and a pair of triggers in the bottom portion of said frame, said triggers being each provided with antifriction devices for engaging a pair of said jaws in spread apart relation.

In testimony whereof I affix my signature.

GEORGE A. BARNARD.